(12) United States Patent
Hsu (10) Patent No.: US 7,313,753 B2
(45) Date of Patent: Dec. 25, 2007

(54) DETECTOR FOR DETECTING INFORMATION CARRIED BY A SIGNAL HAVING A SAWTOOTH-LIKE SHAPE

(75) Inventor: Tse-Hsiang Hsu, Hsinchu (TW)

(73) Assignee: Mediatek Inc., Hsin Chu (TW)

( * ) Notice: Subject to any disclaimer, the term of this patent is extended or adjusted under 35 U.S.C. 154(b) by 434 days.

(21) Appl. No.: 10/923,807

(22) Filed: Aug. 24, 2004

(65) Prior Publication Data
US 2005/0050406 A1 Mar. 3, 2005

(30) Foreign Application Priority Data
Aug. 28, 2003 (TW) ............................. 92123684 A (51) Int. Cl.
*G11B 27/00* (2006.01)
(52) U.S. Cl. ...................... 714/814; 714/776; 714/758; 714/715
(58) Field of Classification Search ................ 714/814, 714/758, 776, 715, 709, 805, 818, 31
See application file for complete search history.

(56) References Cited
U.S. PATENT DOCUMENTS

| | | | | |
|---|---|---|---|---|
| 3,670,304 A | * | 6/1972 | Andresen et al. | ........... 714/709 |
| 4,882,546 A | * | 11/1989 | Takamura et al. | ........... 329/310 |
| 5,295,079 A | * | 3/1994 | Wong et al. | ................. 714/715 |
| 6,101,312 A | * | 8/2000 | Funayama | .................... 386/93 |
| 6,774,835 B1 | * | 8/2004 | Cloetens | ..................... 341/155 |
| 6,988,236 B2 | * | 1/2006 | Ptasinski et al. | ............ 714/758 |

\* cited by examiner

*Primary Examiner*—Cynthia Britt
*Assistant Examiner*—Fritz Alphonse
(74) *Attorney, Agent, or Firm*—Birch, Stewart, Kolasch & Birch, LLP (57) ABSTRACT

A detector for detecting information carried by a signal having a sawtooth-like shape. The detector includes a first band-pass filter with center frequency around a first frequency value for filtering the signal and generating a first filtered signal, a second band-pass filter with center frequency around a second frequency value for filtering the signal and generating a second filtered signal, a first comparator for comparing the first filtered signal with a reference level and generating a first compared signal, a second comparator for comparing the second filtered signal with the reference level and generating a second compared signal, a clock generator for generating a reference clock having a frequency close to the first frequency value according to the second compared signal, and a detection module for generating a bit signal representing the information according to the first compared signal and the reference clock.

11 Claims, 6 Drawing Sheets

DETECTOR FOR DETECTING INFORMATION CARRIED BY A SIGNAL HAVING A SAWTOOTH-LIKE SHAPE

This application claims the benefit of the filing date of Taiwan Application Ser. No. 092123684, filed on Aug. 28, 2003, the content of which is incorporated herein by reference.

BACKGROUND

The invention relates to a detector for detecting information carried by signal having a sawtooth-like shape, and more particularly to a detector having a filter and a comparator to detect the information carried by a signal having a sawtooth-like shape.

Along with advances in optical disc technologies, a new generation of the optical disc rewritable format that is defined as the Blu-Ray has been developed. The track groove in the Blu-Ray optical disc has a wobble shape, and the basic wobble pattern of the track groove is a sine/cosine wave. In the Blu-Ray optical disc, one nominal wobble length (referred to as NWL hereinafter) is equivalent to 69 channel bits, which is the minimum record unit of the Blu-Ray optical disc.

The basic pattern of the wobble is a cosine wave: $\cos\{2\pi^* f_{wob}^* t\}$, where $f_{wob}$ denotes the basic frequency of the wobble. Wobbles in this basic shape are called "Monotone Wobbles" (MW). In addition, some wobbles are modulated in order to carry the address information which are referred to as the ADIP (Addresses in Pre-groove), of some record units on the disc, wherein two modulation methods are involved. The first modulation method is the minimum shift keying—cosine variant (referred to as MSK-cos hereinafter), and the second method is the harmonic modulated wave (referred to as HMW hereinafter).

Figure 1:
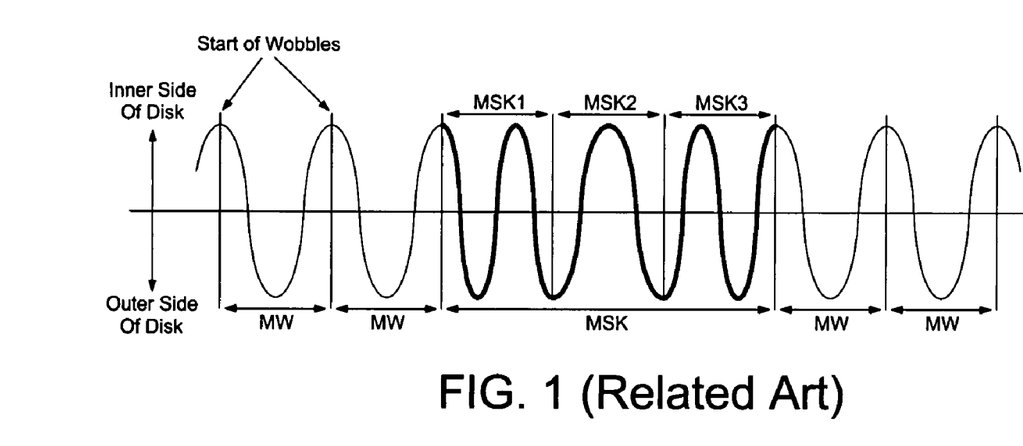
FIG. 1 shows the definition of the MSK mark.

FIG. 1 shows the definition of the MSK mark (referred to as MM hereinafter). As shown in FIG. 1, one MSK mark consists of three NWLs with the following wobble patterns:

a first NWL starts MSK mark with a cosine wobble with a frequency $1.5^* f_{wob}$, and is given by $$\cos\{2\pi^*(1.5^* f_{wob})^* t\} \quad (1)$$

a second NWL continues the MSK mark with a cosine wobble with a frequency $f_{wob}$, and is given by $$-\cos\{2\pi^* f_{wob}^* t\} \quad (2)$$

a third NWL terminates the MSK mark with a cosine wobble with a frequency $1.5^* f_{wob}$, and is given by $$-\cos\{2\pi^*(1.5^* f_{wob})^* t\} \quad (3)$$

Figure 2:
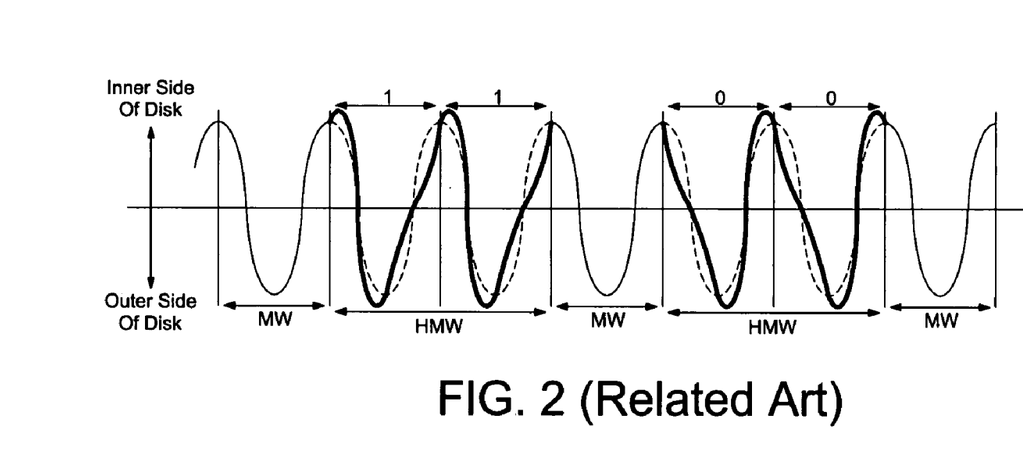
FIG. 2 shows the definition of the sawtooth wobble.

FIG. 2 shows the definition of the sawtooth wobble (referred to as STW hereinafter), which is a wobble having a sawtooth-like shape. A STW is formed by combining the basic cosine wave and a sine wave of the double frequency and is given by:

$$\cos\{2\pi^* f_{wob}^* t\} \pm a^* \sin\{2\pi^*(2^* f_{wob})^* t\} \quad (4)$$

The coefficient a in equation (4) is 0.25.

Such a combination of a cosine signal with the basic frequency $f_{wob}$ and a weighted second harmonic signal forms a sawtooth-like waveform. The "+" or "−" sign creates the left or right inclination of the waveform, where the "+" sign is used to represent a bit information of logic one, while the "−" sign is used to represent a bit information of logic zero.

Figure 3:
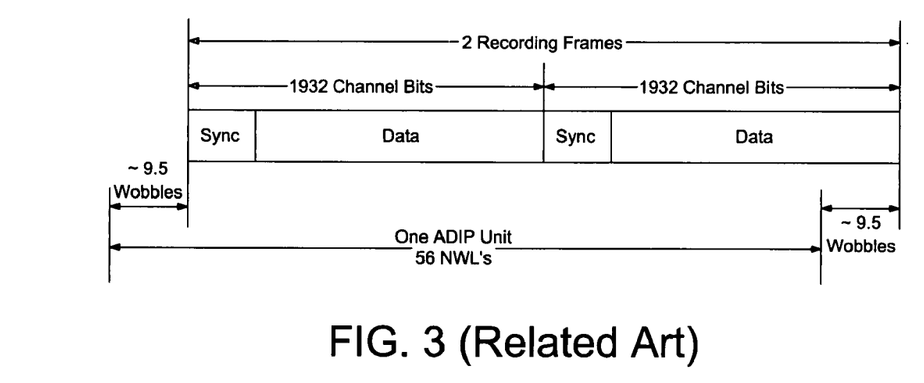
FIG. 3 shows the architecture of the ADIP information of the Blu-Ray optical disc.

FIG. 3 shows the typical ADIP structure of the Blu-Ray optical disc. The data to be recorded onto the optical disc must be aligned with the ADIP addresses which are modulated in the wobble. As shown in FIG. 3, 56 NWLs correspond to two recording frames and each group of 56 NWLs is called an ADIP unit. Each recording frame includes 1932 channel bits containing a sync filed and a data field. Moreover, two adjacent ADIP units are separated by a recording frame having a period of about 9.5 wobble cycles.

Figure 4:
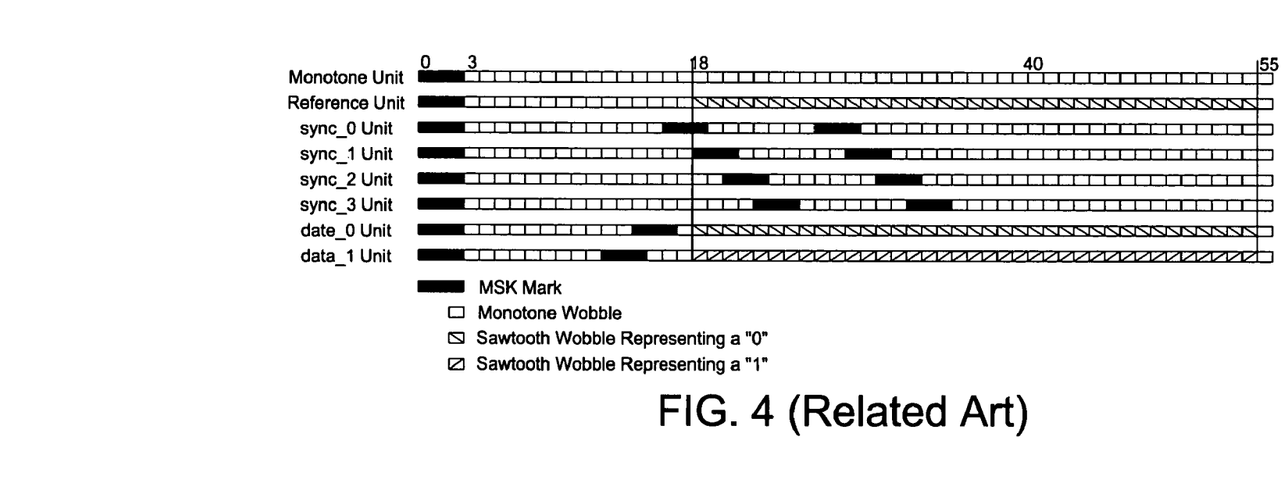
FIG. 4 shows the format of the ADIP unit.

FIG. 4 shows the format of an ADIP unit. As shown in FIG. 4, the following types of ADIP units are defined:

monotone unit: consisting of 1 MM followed by 53 MW;

reference unit: consisting of 1 MM followed by 15 MW, 37 STW, and 1 MW;

sync_0 unit: consisting of 1 MM followed by 13 MW, 1 MSK mark, 7 MW, 1 MM, and 27 MW;

sync_1 unit: consisting of 1 MM followed by 15 MW, 1 MSK mark, 7 MW, 1 MM, and 25 MW;

sync_2 unit: consisting of 1 MM followed by 17 MW, 1 MM, 7 MW, 1 MM, and 23 MW;

sync_3 unit: consisting of 1 MM followed by 19 MW, 1 MM, 7 MW, 1 MM, and 21 MW;

data_1 unit: consisting of 1 MM followed by 9 MW, 1 MM, 3 MW, 37 STW, and 1 MW; and data_0 unit: consisting of 1 MM followed by 11 MW, 1 MM, 1 MW, 37 STW, and 1 MW.

The four kind of sync units are used for synchronization purpose, the data_1 unit is used to represent a bit information of logic one, and the date_0 unit is used to represent a bit information of logic zero. Hence, the ADIP addresses on the optical disc are positioned according to the unit types of the above-mentioned ADIP unit. So, in order to judge the unit types of the ADIP unit correctly, it is an important subject to correctly detecting the information carried by the STW.

SUMMARY

It is therefore an object of the invention to provide a detector for detecting the bit information carried by the sawtooth wobble.

The invention achieves the above-identified object by providing a detector for detecting the information carried by a signal having a sawtooth wobble. The signal contains a first frequency component that is substantially at a first frequency value and a second frequency component that is substantially at a second frequency value. The second frequency value is lower than the first frequency value. The detector comprises a first band-pass filter with central frequency around the first frequency value for receiving the signal and generating a first filtered signal; a second band-pass filter with central frequency around the second frequency value for receiving the signal and generating a second filtered signal; a first comparator for comparing the first filtered signal with a first reference level and generating a first compared signal; a second comparator for comparing the second filtered signal with a second reference level and generating a second compared signal; a clock generator for receiving the second compared signal and generating a reference clock having a frequency close to the first frequency value; and a detection module for generating a bit signal representing the information carried by the signal according to the first compared signal and the reference clock.

BRIEF DESCRIPTION OF THE DRAWINGS

FIGS. 6A to 6E are schematic illustrations showing the waveforms of the signals within the detector of the invention, wherein

FIGS. 7A to 7E are schematic illustrations showing the waveforms of the signals within the detector of the invention, wherein

DETAILED DESCRIPTION

The detector of the invention for detecting information carried by a wobble signal having a sawtooth-like shape will be described with reference to the accompanying drawings.

Figure 5:
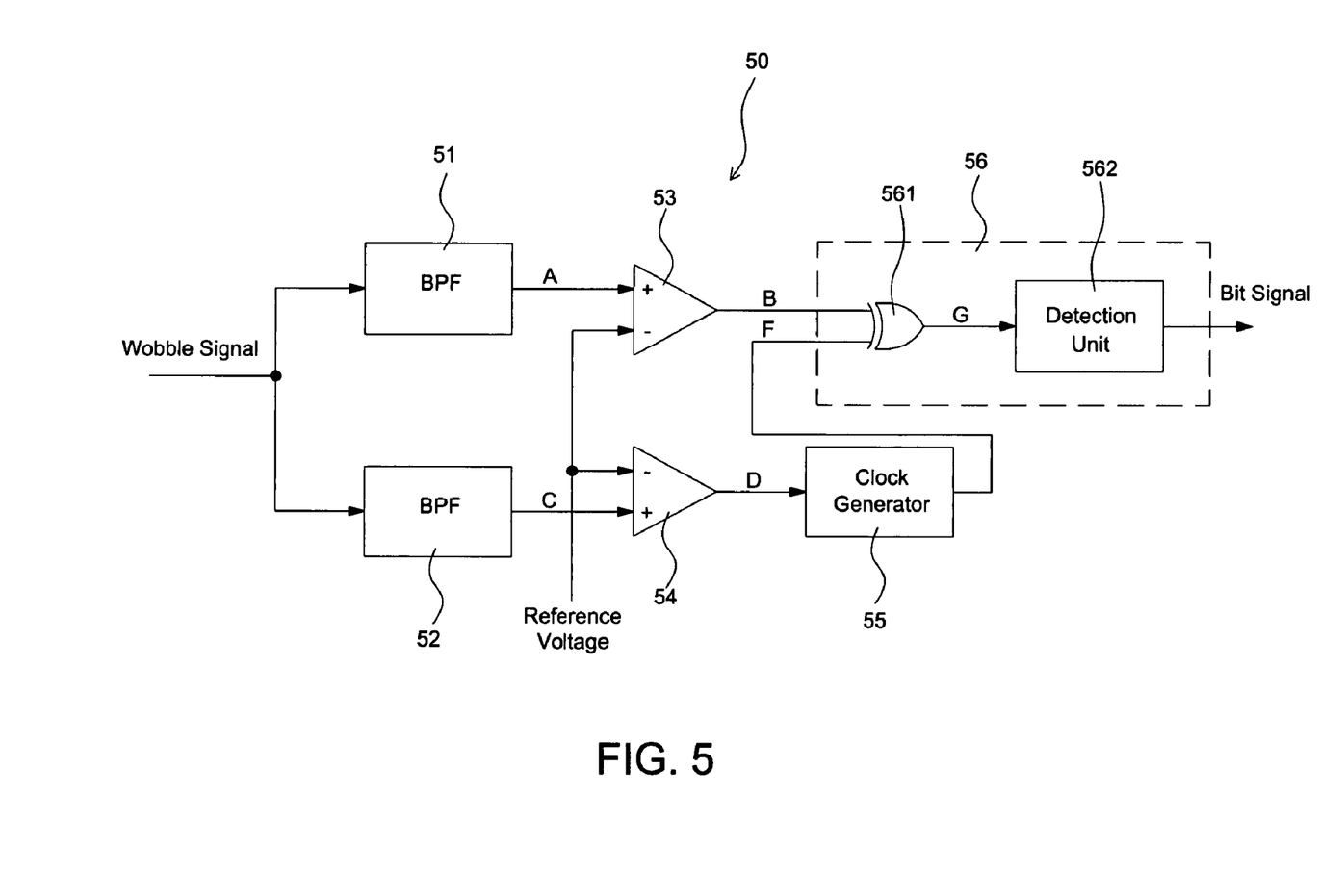
FIG. 5 shows the block diagram of the detector of the present invention.

FIG. 5 illustrates the block diagram of the detector of the present invention for detecting information carried by a wobble signal having a sawtooth-like shape. Referring to this drawing, the detector 50 includes a first band-pass filter 51, a second band-pass filter 52, a first comparator 53, a second comparator 54, a clock generator 55, and a detection module 56.

Let the base frequency of the wobble signal is denoted by $f_{wob}$. As above described, the sawtooth wobble mainly contains two frequency components, one is the base frequency component, and the other is the double-frequency component. The first band-pass filter 51 has its center frequency $f_{c1}$ close to twice the base frequency $f_{wob}$. The first band-pass filter 51 receives the wobble signal and generates a first filtered signal A. The second band-pass filter 52 has its center frequency $f_{c2}$ close to the base frequency $f_{wob}$. The second band-pass filter 52 receives the wobble signal and generates a second filtered signal C. Hence, after the wobble signal passes through the first band-pass filter 51, the base frequency components are filtered out and only the components, i.e. the double-frequency component, near the center frequency $f_{c1}$ are output. Ideally, the signal A is given by $$A = \pm a^* \sin\{2\pi^*(2^*f_{wob})^*t\} \quad (5)$$

Practically, the signal A will be attenuated by the first filter and suffer from noise or interference.

On the other hand, after the wobble signal passes through the second band-pass filter 52, the double-frequency component is filtered out and only the components, i.e. the base frequency component, near the base frequency $f_{c2}$ are output. Ideally, the signal C is given by $$C = \cos\{2\pi^* f_{wob}^* t\} \quad (6)$$

Practically, the signal C will be attenuated by the first filter and suffer from noise or interference.

The first comparator 53 converts the first filtered signal A into a first compared signal B having a square waveform, and the second comparator 54 converts the second filtered signal C into a second compared signal D having a square waveform. For practical implementation, the first comparator 53 and the second comparator 54 may be, as an example, a slicer. That is, when the level of the first filtered signal A is higher than the reference voltage, the first compared signal B is at logic high; otherwise the first compared signal B is at logic low. Similarly, when the level of the second filtered signal C is higher than the reference voltage, the second compared signal D is at logic high; otherwise the second compared signal D is at logic low. The clock generator 55 is used to generate a reference clock F having a frequency twice that of the second compared signal D according to the second compared signal D. As an example, the clock generator 55 could be a typical PLL (Phase-Locked Loop).

The detection module 56 receives the first compared signal B and reference clock F and outputs a bit signal to represent the bit information carried by the sawtooth wobble. The detection module 56, for example, includes an XOR gate 561 and a detection unit 562. The XOR gate 561 receives the reference clock F of the clock generator 55 and the first compared signal B, and outputs a differential signal G. The detection unit 562 receives the differential signal G and outputs the bit signal according to the duty cycle of the differential signal G. If the duty cycle of the differential signal G is greater than 50%, i.e. the high level portion of the differential signal G is greater than its low level portion, the detection unit 562 outputs the bit signal with bit value of 1; and when the duty cycle of the differential signal G is smaller than 50%, i.e. the high level portion of the differential signal G is lower than its low level portion, the detection unit 562 outputs the bit signal with bit value of 0.

For implementation, the detection unit 562 may be implemented using a counter (not shown) and a comparator (not shown). To speak more specifically, the counter is used to count the pulse number of a counting clock, which has a frequency higher than that of the differential signal C, when the differential signal G is at high level during each cycle of the differential signal G. The comparator compares the obtained pulse number with a threshold value. When the obtained pulse number is higher than the threshold value, it means that the duty cycle is greater than 50% and the detection unit 562 will output the bit signal with bit value of 1; and when the obtained pulse number is lower than the threshold value, it means that the duty cycle is lower than 50% and the detection unit 562 will output the bit signal with bit value of 0. Note that, the detection unit may be implemented in various ways, and these detection units may be used with the present invention. Such detection units include, but are not limited to above disclosed detection unit.

Figure 6A:
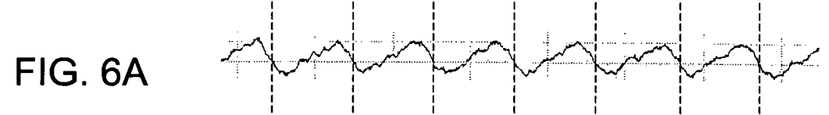
FIG. 6A shows the wobble signal.
Figure 6B:
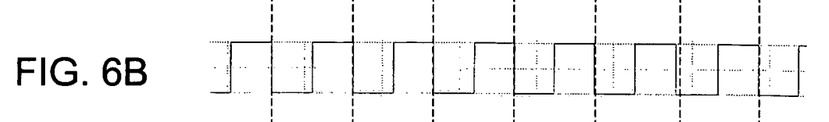
FIG. 6B shows the second compared signal.
Figure 6C:
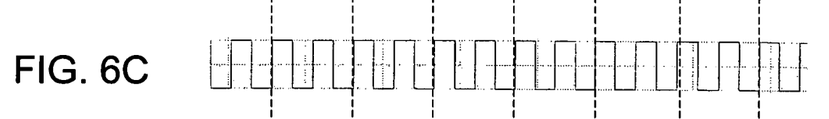
FIG. 6C shows the reference clock.
Figure 6D:
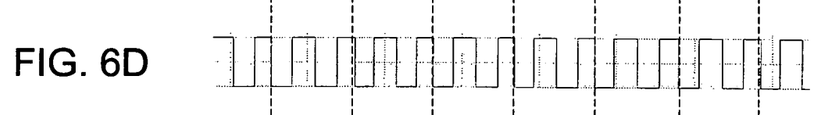
FIG. 6D shows the first compared signal.
Figure 6E:
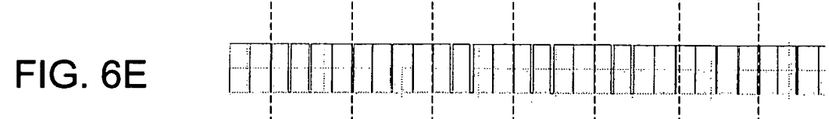
FIG. 6E shows the differential signal.

FIGS. 6A to 6E are schematic illustrations showing the waveforms simulated by the detector of the invention, wherein FIG. 6A shows the wobble signal, FIG. 6B shows the second compared signal D, FIG. 6C shows the reference clock F, FIG. 6D shows the first compared signal B, and FIG. 6E shows the differential signal G As shown in FIG. 6A, the wobble signal is a rightward slanting sawtooth wobble, so the bit information carried by the sawtooth wobble should be 1. After being filtered by the second band-pass filter 52 and sliced by the comparator 54, the frequency of the second compared signal D is substantially the base frequency $f_{wob}$, as can be seen in FIG. 6B. The reference clock F of FIG. 6C is generated by the PLL according to the second compared signal D, and the phase thereof is the same as that of the second compared signal D. The first compared signal B of FIG. 6D is generated by the comparator 53. So, as shown in FIG. 6D, the frequency of the first compared signal B is substantially $2^*f_{wob}$. The differential signal G of the FIG. 6E is generated by performing XOR operation on the reference clock F and first compared signal B.

Hence, as shown in FIG. 6E, the duty cycle of the differential signal G is greater than 50%. In other words, the high level portion of the differential signal G is greater than its low level portion. Since the duty cycle is greater than 50%, the detection unit 562 will correctly output the bit signal with bit value of 1, which is just the expected one.

Figure 7A:
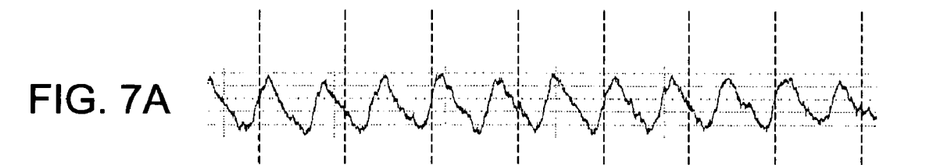
FIG. 7A shows the wobble signal.
Figure 7B:
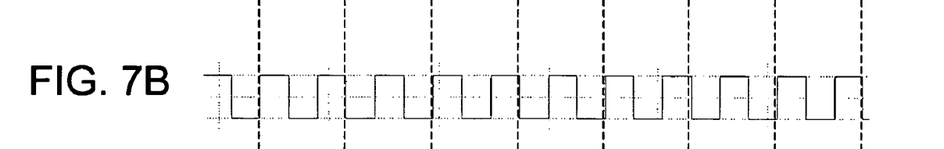
FIG. 7B shows the second compared signal.
Figure 7C:
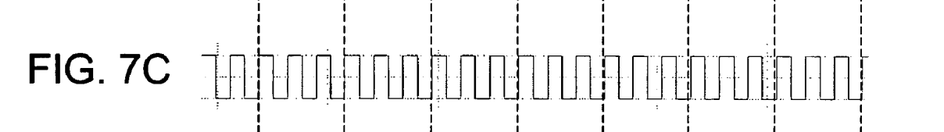
FIG. 7C shows the reference clock.
Figure 7D:
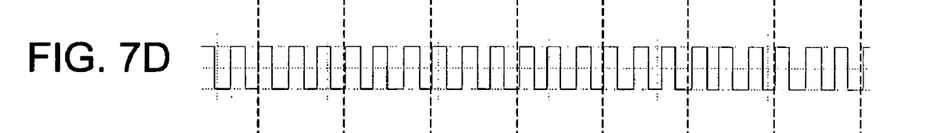
FIG. 7D shows the first compared signal.
Figure 7E:
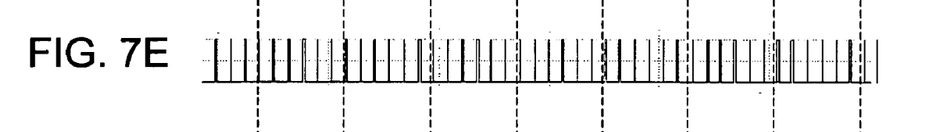
FIG. 7E shows the differential signal.

FIGS. 7A to 7E are schematic illustrations showing the waveforms simulated by the detector of the invention, wherein FIG. 7A shows the wobble signal, FIG. 7B shows the second compared signal D, FIG. 7C shows the reference clock F, FIG. 7D shows the first compared signal B, and FIG. 7E shows the differential signal G. As shown in FIG. 7A, the wobble signal is a leftward slanting sawtooth wobble, so the bit information carried by the sawtooth wobble should be 0. After being filtered by the second band-pass filter 52 and sliced by the comparator 54, the frequency of the second compared signal D is substantially the base frequency $f_{wob}$, as can be seen in FIG. 7B. The reference clock F of FIG. 7C is generated by the PLL according to the second compared signal D, and the phase thereof is the same as that of the second compared signal D. The first compared signal B of FIG. 7D is generated by the comparator 53. So, as shown in FIG. 7D, the frequency of the first compared signal B is substantially $2*f_{wob}$. The differential signal G of the FIG. 7E is generated by performing XOR operation on the reference clock F and first compared signal B.

Hence, as shown in FIG. 7E, the duty cycle of the differential signal G is less than 50%. In other words, the high level portion of the differential signal G is less than its low level portion. Since the duty cycle is less than 50%, the detection unit 562 will correctly output the bit signal with bit value of 0, which is just the expected one.

Figure 8:
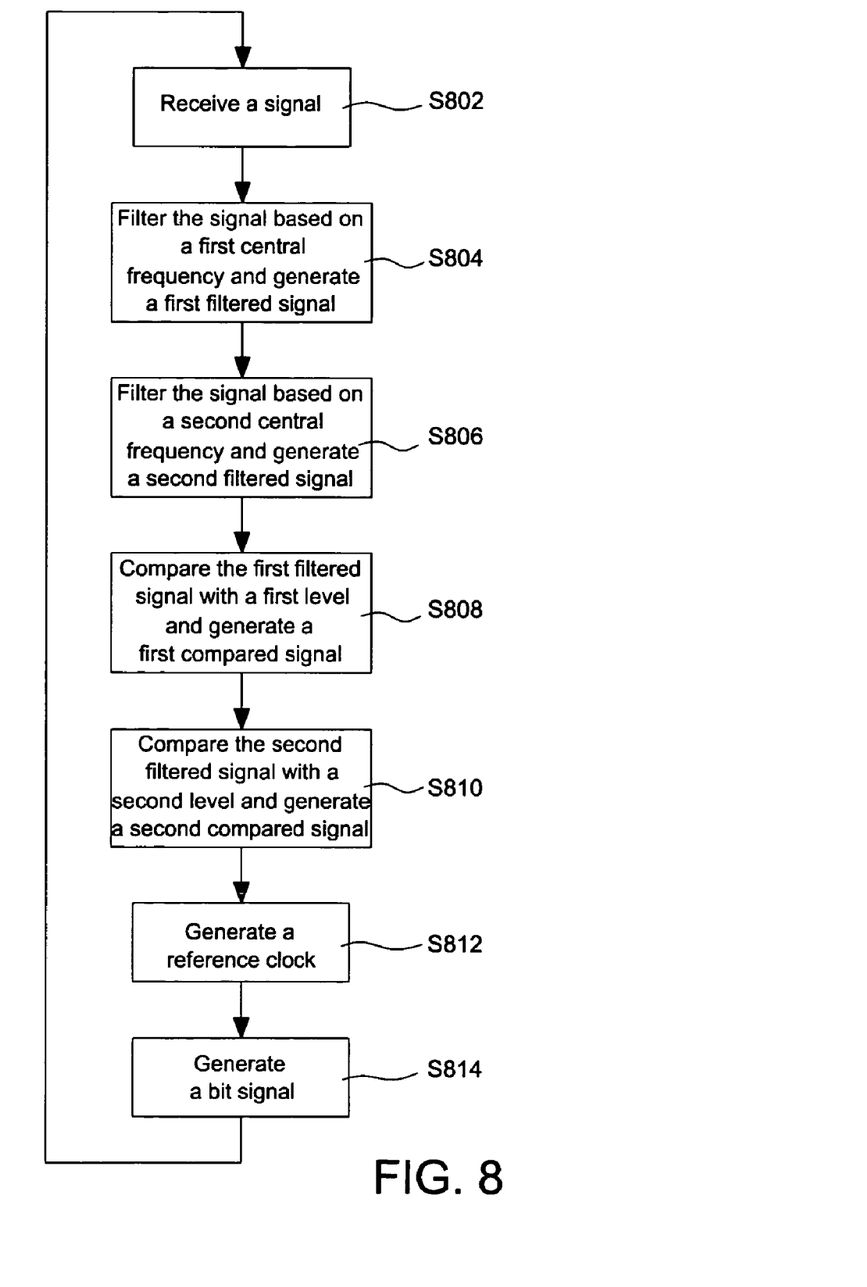
FIG. 8 shows a flow chart of a method according to the present invention.

FIG. 8 shows a flowchart of a method for detecting information carried by a signal having a sawtooth-like shape according to the present invention. The signal contains a first frequency component that is substantially at a first frequency value and a second frequency component that is substantially at a second frequency value. The second frequency value is lower than the first frequency value. As an example, the first frequency value is twice the second frequency value.

The method comprises the steps of:

Step S802: receive the signal.

Step S804: filter the signal based on a central frequency around the first frequency value and generating a first filtered signal.

Step S806: filter the signal based on a central frequency around the second frequency value and generating a second filtered signal.

Step S808: compare the first filtered signal with a first reference level and generating a first compared signal.

Step S810: compare the second filtered signal with a second reference level and generating a second compared signal. The first reference level and the second reference level may be the same.

Step S812: generate a reference clock having a frequency close to the first frequency value according to the second compared signal.

Step S814: generate a bit signal representing the information carried by the signal according to the first compared signal and the reference clock. Firstly, the method generates a differential signal by performing XOR operation on the first compared signal and the reference clock. Then, the method outputs the bit signal with bit value of 1 when the duty cycle of the differential signal is greater than a threshold; otherwise, the method outputs the bit signal with bit value of 0 when the duty cycle of the differential signal is smaller than the threshold.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A detector for detecting information carried by a signal having a sawtooth-like shape, the signal contains a first frequency component that is substantially at a first frequency value and a second frequency component that is substantially at a second frequency value, the second frequency value being lower than the first frequency value, the detector comprising:
   a first band-pass filter with central frequency around the first frequency value for receiving the signal and generating a first filtered signal;
   a second band-pass filter with central frequency around the second frequency value for receiving the signal and generating a second filtered signal;
   a first comparator for comparing the first filtered signal with a first reference level and generating a first compared signal;
   a second comparator for comparing the second filtered signal with a second reference level and generating a second compared signal;
   a clock generator for receiving the second compared signal and generating a reference clock having a frequency close to the first frequency value; and
   a detection module for generating a bit signal representing the information carried by the signal according to the first compared signal and the reference clock.

2. The detector according to claim 1, wherein the first frequency value is twice the second frequency value.

3. The detector according to claim 1, wherein the first reference level and the second reference level are the same.

4. The detector according to claim 1, wherein the clock generator is a PLL (Phase-Locked Loop).

5. The detector according to claim 1, wherein the detection module comprises:
   an XOR gate for receiving the first compared signal and the reference clock and generating a differential signal; and
   a detection unit for receiving the differential signal, outputting the bit signal with bit value of 1 when the duty cycle of the differential signal is greater than a threshold, and outputting the bit signal with bit value of 0 when the duty cycle of the differential signal is smaller than the threshold.

6. The detector according to claim 5, wherein the threshold is 50%.

7. A method for detecting information carried by a signal having a sawtooth-like shape, the signal contains a first frequency component that is substantially at a first frequency value and a second frequency component that is substantially at a second frequency value, the second frequency value being lower than the first frequency value, the method comprising the steps of:
   receiving the signal;
   filtering the signal based on a first central frequency around the first frequency value and generating a first filtered signal;

filtering the signal based on a second central frequency around the second frequency value and generating a second filtered signal;

comparing the first filtered signal with a first reference level and generating a first compared signal;

comparing the second filtered signal with a second reference level and generating a second compared signal;

generating a reference clock having a frequency close to the first frequency value according to the second compared signal; and generating a bit signal representing the information carried by the signal according to the first compared signal and the reference clock.

8. The method according to claim 7, wherein the first frequency value is twice the second frequency value.

9. The method according to claim 7, wherein the first reference level and the second reference level are the same.

10. The method according to claim 7, wherein the step of generating the bit signal comprises the steps of:

generating a differential signal by performing XOR operation on the first compared signal and the reference clock;

outputting the bit signal with bit value of 1 when the duty cycle of the differential signal is greater than a threshold; and outputting the bit signal with bit value of 0 when the duty cycle of the differential signal is smaller than the threshold.

11. The method according to claim 10, wherein the threshold is 50%.

* * * * *